March 5, 1935. J. SCHMELLER, SR Re. 19,490

METHOD OF REWORKING FINELY DIVIDED METAL PARTICLES

Original Filed April 3, 1926 2 Sheets-Sheet 1

INVENTOR.
John Schmeller, Sr.
BY
Fay, Oberlin & Fay
ATTORNEYS.

March 5, 1935. J. SCHMELLER, SR Re. 19,490

METHOD OF REWORKING FINELY DIVIDED METAL PARTICLES

Original Filed April 3, 1926 2 Sheets-Sheet 2

INVENTOR.
John Schmeller, Sr.
BY
Fay Oberlin & Fay
ATTORNEYS

Reissued Mar. 5, 1935

Re. 19,490

UNITED STATES PATENT OFFICE 19,490

METHOD OF REWORKING FINELY DIVIDED METAL PARTICLES

John Schmeller, Sr., Lakewood, Ohio, assignor to Schmeller Holding Company, Cleveland, Ohio, a corporation of Ohio Original application April 3, 1926, Serial No. 99,482. Divided and application February 8, 1928, Serial No. 252,738, Patent No. 1,810,535, dated June 16, 1931. Application for reissue June 15, 1933, Serial No. 676,022

20 Claims. (Cl. 75—58)

This invention, as indicated, relates to a method of remelting finely divided particles of metal such as aluminum or brass or alloy borings, turnings, and the like, and making castings or ingots therefrom as a single, continuous process. This application is a division of my application Serial No. 99,482, filed April 3, 1926, Patent No. 1,659,445. The method particularly includes the reworking of aluminum stock of finely divided character, including aluminum borings, turnings, and skimmings, which may be readily remelted and reworked in a single operation. The invention includes a furnace with agitating mechanism which is adapted to receive aluminum material such as discarded castings, sheets and scrap of every character, as well as borings, turnings, and skimmings, and which will produce as a continuous operation a supply of molten aluminum suitable for casting or ingot purposes.

Heretofore the remelting of aluminum, particularly finely divided aluminum such as has been mentioned, has involved many difficulties because of the light character of the stock and the readiness with which the same is oxidized. The process of recovering said metal from such finely divided stock in most instances heretofore has involved a preliminary melting at low heat in small individual furnace pots stirred by hand or by rotary stirring devices, and then casting into ingots following by remelting of said ingots preliminary to use in making various articles of manufacture. Open furnaces for producing ingots from finely divided stock, also have been used, but such apparatus cannot be used to bring the metal to casting heat because of thermal losses. It has not been the practice heretofore with a single apparatus to remelt finely divided aluminum or the like, and to maintain the same at an adequate temperature as a liquid supply of aluminum from which the necessary quantities for casting purposes might be drawn into casting ladles as required.

The principal object of the present invention, therefore, is to provide an improved method of supplying molten aluminum or like material from finely divided stock for casting purposes. Another object of this invention is to provide a continuous process for furnishing a molten aluminum supply whereby finely divided aluminum may be used as the stock for remelting and wherein the recovery from such stock may be equal to or in excess of the values for such stock determinable in an industrial assay laboratory under present methods.

Another object of the invention is to provide a furnace for the purpose set forth which will operate continuously and with a minimum expenditure of fuel and labor and maximum output of product. A still further object of the invention is to provide a furnace wherein agitating means will operate vertically in the molten metal at the charging side of the furnace and insure thorough intermixture of the added stock with the molten mass and removal of all grease and the foreign matter therefrom preliminary to the carrying of the pure molten metal into the discharge side of said furnace, and through this agitating action, termed "vertical puddling", to improve the quality of the metal, puddling out the oxides and foreign substances including free iron borings which are caused to float and may be readily skimmed from the top. The grease is removed in the first chamber and used as fuel.

A still further object of the invention is to provide a furnace for the purpose specified without a draft or exit for the gases other than those provided by lateral openings in the walls of the upper portion of the furnace and wherein the amount of oxygen or air charged into the furnace is kept at a minimum and below the point necessary for complete combustion of the fuel gases admitted thereto. Still another object of the invention is to provide a counter-balance for the mechanism of the furnace whereby the agitating devices may be easily removed from the furnace bath and also to provide an adjustment for such agitating devices whereby the position of the same, relative to the liquid content of the furnace, may be varied as desired. Other and further objects of the invention will appear in the following description.

The annexed drawings and the following description set forth in detail certain means and one mode of carrying out the invention, such disclosed means and mode illustrating, however, but several of various ways in which the principle of the invention may be used.

As has been indicated, the general practice heretofore followed in reworking or remelting finely divided aluminum has been to place the same in open furnaces and to agitate the same by hand or by means of mechanically rotated propelling devices. Such method of remelting involves thermal losses and the average heat therein is below good casting temperature. This requires casting into ingots and thereafter remelting of such ingots to obtain metal which is of high enough temperature for use in casting into the various articles of commerce for which the metal is employed. This procedure entails a remelting loss of from 1 to 2 per cent. as well as the cost of the additional remelting operation. Thus to obtain a quantity of aluminum sufficient for foundry purposes it is necessary to employ a large number of laborers and accumulate the product from a series of individual furnace pots or open furnaces in a remelting furnace in order to carry on the casting operations.

My improved method of reworking finely divided aluminum consists in preparing a bath of molten aluminum into which the finely divided aluminum is fed as raw stock, and in continuously agitating the portion of said bath to which said stock is added in order that it may be rapidly absorbed into the molten mass in said bath and the impurities such as oil, grease and dirt, free iron, oxide and the like, may be rapidly freed therefrom, and in withdrawing from another portion of said bath the aluminum freed of such impurities and at a temperature suitable for casting. My method is preferably carried out by means of an apparatus wherein each furnace is provided with a charging and agitation section, and a casting supply section, the metal charged into the charging side being of any desired degree of fineness and the metal withdrawn on the opposite side of the furnace being taken in such quantities as may be necessary for the purposes in hand.

Figure 1:
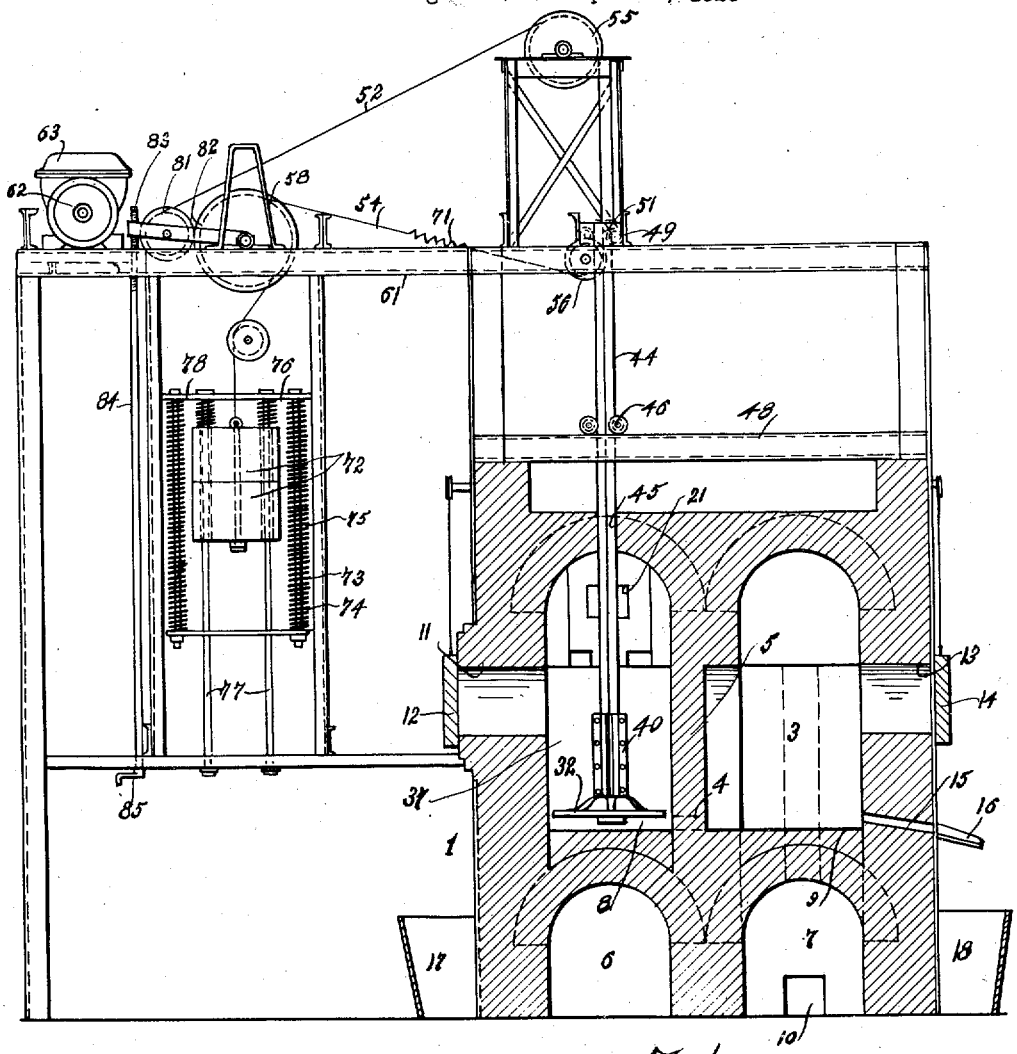
Figure 1 is a side elevation partially in section of a furnace installation embodying the principle of my invention.
Figure 6:
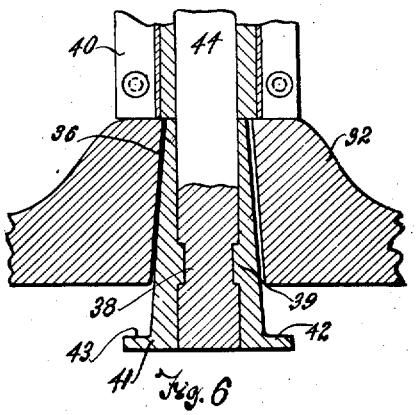
Figure 6 is an enlarged sectional detail view showing the grid attaching means.
Figure 2:
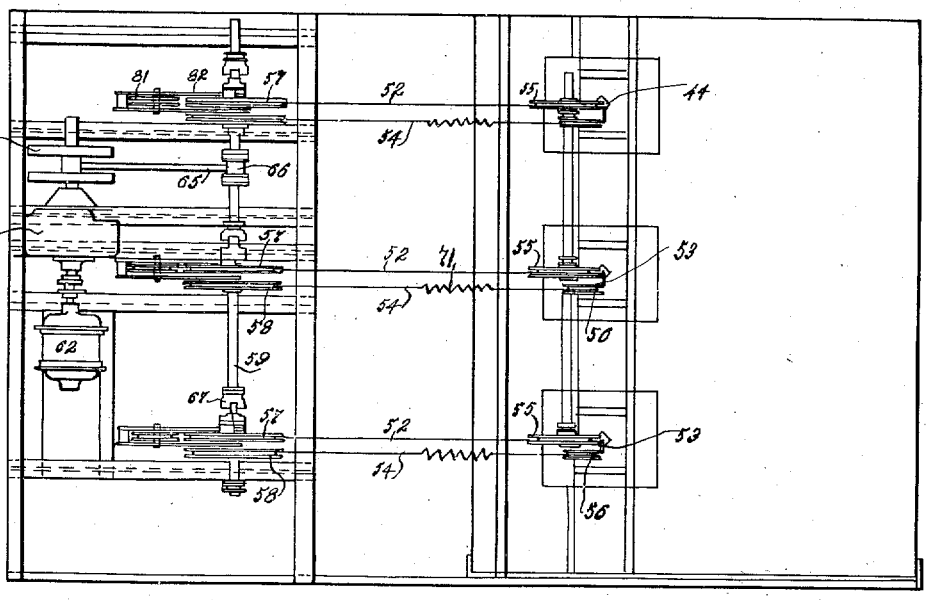
Figure 2 is a top plan view of the apparatus shown in Figure 1.
Figure 3:
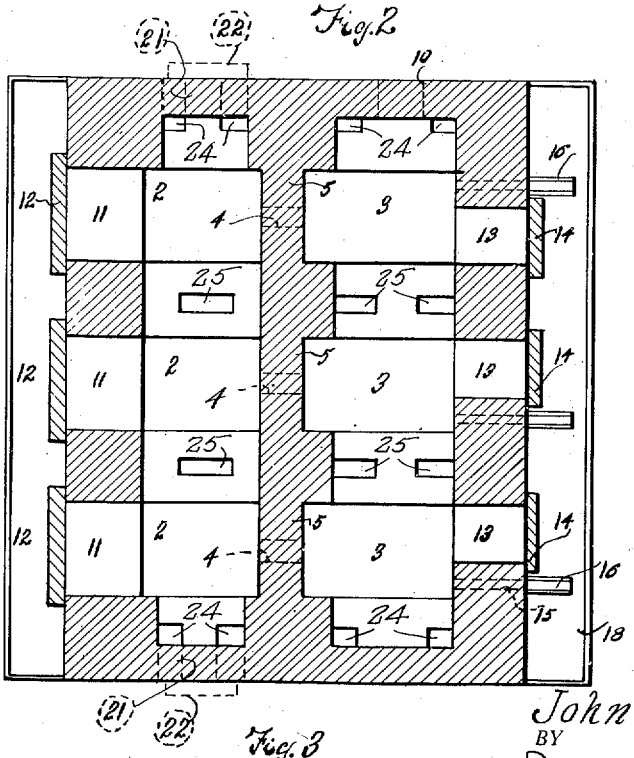
Figure 3 is a sectional plan view of the furnace proper.
Figure 4:
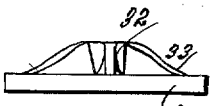
Figure 4 is a side elevation of the grid.
Figure 5:
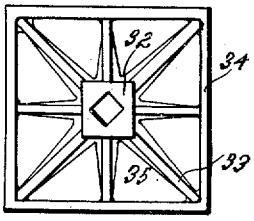
Figure 5 is a top plan view of the grid.

As is clearly shown in Figures 1 and 3 of the drawings, the furnace 1 comprises a brick structure formed of piers and arches and providing for each furnace unit, two closed furnace chambers 2, 3, separated by a heavy brick wall and communicating with each other through a small conduit 4 adjacent the floor of said chambers. The reservoir sections of said furnace unit are shown as of substantially equal size although the proportions may be varied in accordance with special requirements or with the character of the stock and the rate of use of the product or other conditions. At a point above the level of the molten metal in said chambers, charging and skimming doors are provided.

While a single furnace unit might be provided, it has been found more economical to construct three or more furnace units in series in a single structure, as shown, which may be simultaneously operated by a crew of workmen more economically than a single furnace unit or a series of independent furnaces. Likewise the operating mechanism for a series of furnace units may be more economically installed and the heat losses may be proportionately reduced. In the drawings, therefore, I have illustrated three furnace units in series. The units are each operatively distinct from the others and a different alloy may be run in each chamber. Each of said units is divided centrally by a partition wall 5 so as to provide on one side a combined charging and agitating chamber 2 through which the metal stock is fed into the furnace and on the opposite side with a heating chamber 3 for the reception and temperature control of the casting supply of molten metal.

The dividing wall 5 preferably extends from the ground to the roof of the furnace. Beneath each of the series of chambers 2, 3, arched heating chambers 6, 7, extend. The floors 8, 9, of the communicating chambers 2, 3, rest upon these arches and are packed with ganister or other heat resisting material, and the walls of said chambers are formed of or lined with fire-brick. Where a series of three furnace units is provided, it is found more economical of fuel to have the division walls betwen the several casting sections extend only to a point slightly above the side doors so that the gases in the upper part of the furnace on the respective sides of the dividing wall 5 may travel freely into any one of the three adjacent charging chambers or the three adjacent casting chambers. Centrally of the outer wall of each of the charging chambers a charging opening 11 adapted to be closed by a sliding charging door 12 formed of fire brick, is provided.

Centrally of the outer wall of each of the series of the casting chambers an opening 13 is provided adapted to be closed by a sliding fire-brick door 14. Within the upper open portion of the series of casting chambers, a fuel supply nozzle (not shown) is provided through which atomized crude oil or some such fuel mixture may be projected into the casting chambers. Counterweights (not shown) may be individually applied to each of the doors of the several charging and casting chambers so that the same may be readily lifted and lowered when the furnace is in operation. In addition to the fuel supply charged directly into the upper portion of the casting chambers above the metal reservoirs, provision is made for the heating of each of said series of furnaces by means of nozzles (not shown) within one end of the arched chambers 6 and 7 heretofore described. An opening 10 is provided at the end of the chamber 7 to permit egress of excess hot gases at that end of the furnace, and this lower opening also constitutes a safety overflow in the event of a leak in the metal reservoirs.

On the discharge or casting side of the furnace, a tap hole 15 and spout 16 is provided adjacent the central lower portion of each of the metal reservoirs. Along each lateral side of the furnace tanks or troughs 17, 18, adapted to be filled with water are provided into which hot skimmings from the top surface of the molten metal may be dropped as the occasion arises. The depositing of the skimming in the troughs separates the aluminum from the dirt and the aluminum may be again used as part of a charge for the furnace.

At each end of the charging side of the series of furnace units adjacent the top arch an opening 21 is provided, over which a door 22 lined with fire-brick is hung, and through which the furnace gases carrying light dust and dirt and the burning particles of grease and oil, which may be mingled therewith, partially escape. These doors also serve as safety or "explosion" doors and prevent undue pressure within the furnace.

It will be noted that above the surface of the molten mass of metal the furnace carries a heavy bank of hot gases which are sufficient in quantity to completely fill the space referred to and that such gases are at a slightly higher pressure than the outside atmosphere and constantly seek a passageway through the end openings on the charging side of the furnace heretofore described. Thus, when metal stock is charged through any of the several openings into the charging chambers, but little air enters at such points because of the higher pressure of the gases within the furnace which seek egress at such time. Each of the end and internal walls of both the charging and casting chambers is provided with a flue 24, 25, respectively, through which the gases of combustion may pass in part, thus maintaining the temperature of the furnace walls at the desired point. The flues on the casting side are ordinarily left open but the flues on the charging side are kept closed by covers inasmuch as the lower heating chamber 6 is only intended for emergency use, at times when the furnace charge might freeze and require a high degree of heat to remelt.

The means for agitating the molten mass of metal on the charging side of the furnace will now be described and while a particular embodiment of such apparatus is illustrated, it is to be understood that other mechanism for accomplishing the same result may be employed instead of that illustrated. Within each of the charging chambers a grid or stirring member 31 is provided which is of an outline similar to that of the furnace chamber and of slightly smaller size than said chamber. Said member comprises a heavy central portion or boss, 32, and a series of radial arms 33 gradually decreasing in thickness toward their free ends and joined at such ends by a rim 34 of metal corresponding in outline to the outline of the furnace chamber and spaced from the walls thereof. Between the radiating arms spaces 35 are provided through which the molten metal may freely pass as the grid is plunged downwardly into the molten metal and withdrawn therefrom by the mechanism presently to be described.

Centrally of the grid a bevel socket 36 is provided through which the lower end of the operating stem 37 of the agitating device may be received. The lower end of the stirring rod or operating member is provided with notches 38 to receive projections 39 upon a series of shoes 41 which have beveled sides 42 terminating in outwardly extending flanges, 43. In order to engage the grids with the operating rods, the lower ends of said rods are inserted through the central apertures of said grids and the shoes or tapered plates are engaged with said rods and the grid lowered on the outer beveled surfaces of said plates. The beveled surfaces on the grid aperture and on the outer side of the respective plates coact to insure a firm engagement of the grid with the rod. The rod may be supplied in two sections which are joined to each other in a spliced joint 44 providing a pair of shoulders and overlapping extensions of half the rod size which are firmly bolted together. A boot 40 packed with fire clay and strapped about each rod above the grid prevents the burning out of the rod as it is plunged into the molten mass of metal.

Each of the rods is engaged through an aperture 45 in the roof of the charging side of the furnace so as to reciprocate therein with a minimum loss of heating gases therethrough. Above the furnace said rods are each adapted to reciprocate between two pairs of rollers 46, 49, firmly mounted upon a supporting frame 48 so as to maintain said rod in constant alignment with the aperture through said furnace roof. These rollers are preferably flanged rollers engaging in pairs on opposite sides of the square operating rod and suitable lubricating devices for said rollers may be provided. The rod is set angularly to provide for easy removal of oxide and refuse or skimming.

The upper end of the rod is provided with an aperture 51 for attaching a lifting cable 52. Adjacent the upper end of the rod an extension arm 53 is provided to which a grid depressing cable 54 is secured. The respective cables are passed about pulleys 55, 56, secured to fixed supports above the rod and adjacent the roof of the furnace respectively and thence passed in opposite directions to a pair of sheave wheels 57, 58 mounted upon a shaft 59 preferably located on a platform 61 above the level of the furnace roof. The shaft carrying the respective pairs of sheave wheels is oscillated by suitable mechanism shown in this instance as an electric motor 62 coupled with a suitable reducing gear 63 to a crank arm 64 which is joined by a connecting rod 65 with a similar crank arm 66 on the oscillating shaft. The proportions of the parts are such that the shaft will be rotated through approximately 90° with each complete rotation of the first mentioned crank arm.

Each of the pairs of sheave wheels heretofore described is provided with a clutch member 67 on the oscillating shaft. The shifting bars (not shown) for the clutches are extended from the elevated platform to a position convenient to the furnace floor so that the operation of the clutches may be readily controlled adjacent the charging side of the furnace. In addition to the sheave wheels heretofore described and the fixed pulleys, it is desirable to provide counterweights for the grids and supporting arms and spring take-up means to prevent excessive strains upon the mechanism. Accordingly, a spring 71 is inserted in the line of the grid depressing cable and counterweight 72 is carried at the end of the grid elevating cable. The counterweight is adapted to bear against a stirrup bar 73 supported on a pair of springs 74 which are secured to a fixed support 76 above the top range of motion of the counterweight so as to hold said bar in the path of movement of the counterweight when the grid is drawn from the metal bath. The counterweights are guided upon a pair of bars 77 supported at each end in the frame of the operating mechanism and springs 78 on said bars serve as buffers. An adjusting pulley 81 is provided in the line of grid elevating cable preferably supported on a pair of arms 82 pivoted to the frame at a point adjacent the sheaves and supporting said pulley rearwardly in alignment therewith. Each of said pairs of frames is provided with a stationary nut 83 through which the upper end of a screw threaded rod 84 is adapted to engage. A hand-wheel 85 is attached at the lower end of said rod whereby said pulley may be adjusted upwardly or downwardly to the necessary extent to lift the grid to any point desired with respect to the liquid mass in the furnace chamber. Thus by turning the screw in one direction the grid may be fully withdrawn from the bath of liquid metal and held at a point above the charging opening of its furnace.

When adjusted in the opposite direction, the grid may be forced to a considerable depth within the molten mass of metal as it reaches its lowest limit of motion in the charging side of the furnace. The spring provided in the grid depressing cable is put under tension as the grid is elevated and is relieved of the larger part of such tension when the grid is lowered to its usual operative position. It also serves as a resilient safety device when the grid strikes an obstruction in its descent. Thus complete control of the agitating mechanism of the furnace is provided both as to the starting and stopping of the agitation and the position of the agitator with respect to the molten mass of metal may be readily adjusted. Through a suitable rheostat the motor speed of the operating device may be controlled and thus the rate of agitation may be regulated.

The construction of the apparatus has been described. The method of operation will now be briefly outlined.

In order to start an individual furnace or a series of furnaces, the burner above the casting or discharge side of the furnaces is ignited and the entire furnace structure is thoroughly heated. The burner below the casting side also may be used to carry on the heating more rapidly. It is ordinarily not necessary to use the burner beneath the floor of the charging chamber as the heat in the casting chamber is adequate to bring the temperature of the entire structure to the proper point. The charging side of the furnace is then filled with ingots and scrap sufficient in quantity to form a liquid mass of metal of substantial depth in the two furnace chambers when the same has been melted. When the charge in the casting side of the furnace becomes a molten mass and flows into the charging side of the furnace through the aperture centrally of the dividing wall of said furnace, the apparatus is ready to receive finely divided stock on the charging side. When a suitable temperature has been attained, the lower burner may be extinguished if desired. The agitating mechanism of the furnace is then started and finely divided stock is supplied through the charging openings. The grease and oil found upon the stock will provide adequate fuel for the charging section of the furnace to maintain a high temperature therein and the fuel in the casting chamber will maintain the molten mass at that side of the furnace at the desired temperature for casting.

The agitating mechanism is maintained in continuous operation and the charging doors are opened in succession and finely divided aluminum or other stock which it is desired to charge into the furnace is fed therein. When moisture is present in the raw stock, it is desirable to first place the greater portion of the charge upon the sill of the charging opening and after the charging door has been closed to again open said door and push the dried mass from the sill into the furnace.

The agitating devices ordinarily rise and fall once every two seconds although the speed may be changed in accordance with the amount of metal in the furnace, the character of the raw stock, and the rate of withdrawal on the casting side of the furnace.

As the finely divided aluminum is fed into the furnace it is plunged beneath the surface of the molten metal through the action of the grid and the particles are intermingled and combined with the molten mass through the successive strokes of the grid. The finely divided particles are thus rapidly and completely incorporated with the molten mass on the charging side of the furnace. The purer metal will descend into the reservoir in the charging side of the furnace and as metal is withdrawn from the casting side will flow through the aperture centrally of the base of the partition wall of the furnace and will rise in the casting side of the furnace to maintain the level in the respective sides of the furnace reservoir at a uniform point.

In the casting side of the furnace the metal is exposed to the direct heating action of the flame projected from the nozzle adjacent the upper portion of said section and may also be subjected to heat from the burner at the base of the furnace should such heating action be required. The temperature of the furnace may thus be regulated to maintain the metal in the furnace at a suitable temperature for casting.

During the course of the operation, the workmen about the furnace may skim the surface of the molten metal to remove impurities from time to time. Such skimmings may be dropped into the tanks at the respective sides of the furnace and later may be again introduced into the furnace through the charging openings along with other stock used to feed the furnace.

It may also be found desirable to place into the furnace on the charging side, quantities of flux such as cryolite, calcium chloride, zinc chloride, and the like, in order to facilitate the removal of impurities.

Thus it will be apparent the method and mechanism above described provide for a continuous supply of aluminum for casting purposes and permit the use of a very finely divided aluminum with which a large percentage of grease and oil may be intermingled and permit the reworking of such metal at a high rate of speed and with a recovery equal or superior to the quantities which are ascertained to be recoverable by laboratory assays.

While reference has been made in the specification and some of the claims to the use of two chambers, it is to be understood that equivalent construction such as a plurality of charging chambers and an associated casting chamber or a single charging chamber and a plurality of casting chambers associated therewith, would be within the purview of the invention. Likewise while the invention has been described as particularly adapted for use with finely divided aluminum, it is to be understood that the process and apparatus is not intended to be limited to use with that metal or its alloys and may be used with any other finely divided metal requiring similar treatment for successful commercial reworking.

Other modes of applying the principle of my invention may be employed instead of the one explained, changes being made as regards the means and the steps herein disclosed, provided those stated by any of the following claims or their equivalent be employed.

I therefore particularly point out and distinctly claim as my invention:

1. In a method of melting and refining metal, the steps which consist in applying heat to bring the metal to a molten condition, and thereafter maintaining the molten condition of said metal and refining and deoxidizing the same by puddling the molten material from a position above the level thereof downwardly in a substantially vertical direction and setting up a plurality of substantially vertical current streams of molten metal to interact upon each other.

2. In a method of melting and refining aluminum, the steps which consist in applying heat to bring the aluminum to a molten condition, and thereafter maintaining the molten condition of said aluminum and refining and deoxidizing the same by puddling the molten material from a position above the level thereof downwardly in a substantially vertical direction and setting up a plurality of substantially vertical current streams of molten aluminum to interact upon each other.

3. In a method of melting and refining aluminum, the steps which consist in applying heat to bring said aluminum to a molten condition, maintaining a reducing atmosphere over said molten mass, continuously puddling said molten mass from a position above the level thereof downwardly in a substantially vertical direction, adding subdivided aluminiferous material to said mass while continuing the vertical puddling of the same, and setting up overlapping currents of molten metal to incorporate the individual portions of unmelted material and to substantially deoxidize the molten mass.

4. A method of melting and refining aluminum as a single continuous operation to produce a product suitable for use in commercial fabrication which includes the steps of maintaining melting temperature in a mass of molten aluminum and puddling said mass of aluminum from a position above the level thereof downwardly in a substantially vertical direction continuously to refine and deoxidize said molten mass of aluminum.

5. A method of melting and refining aluminum as a single continuous operation to produce a product suitable for use in commercial fabrication which includes the steps of maintaining melting temperature in a mass of molten aluminum through a source of heat applied indirectly to said mass of aluminum and puddling said mass of aluminum from a position above the level thereof downwardly in a substantially vertical direction continuously to refine and deoxidize said molten mass of aluminum.

6. A method of melting and refining aluminum as a single continuous operation to produce a product suitable for use in commercial fabrication which includes the steps of maintaining melting temperature in a mass of molten aluminum, puddling said mass of aluminum in a substantially vertical direction from a point above said molten mass, adding material to said mass of molten aluminum from a point above the same, and continuing to puddle the same in a substantially vertical direction to carry such added material downwardly into said mass of molten aluminum, and setting up overlapping currents of molten metal to incorporate said added material and thereafter continuously puddling in a substantially vertical direction said mass of molten aluminum and added material to refine and substantially to deoxidize all of said material.

7. A method of melting and refining aluminum as a single continuous operation to produce a product suitable for use in commercial fabrication which includes the steps of maintaining melting temperature in a mass of molten aluminum, puddling said mass of aluminum in a substantially vertical direction from a point above said molten mass, adding raw aluminiferous material and suitable fluxes and continuously puddling the same in a substantially vertical direction to carry such added material and fluxes downwardly into said mass of molten aluminum and setting up overlapping currents of molten metal to incorporate said added material and fluxes and thereafter continuously puddling in a substantially vertical direction said mass of molten aluminum and added material to refine and substantially to deoxidize all of said material.

8. A method of melting and refining aluminum as a single continuous operation to produce a product suitable for use for commercial fabrication which includes the steps of maintaining melting temperature in communicating masses of aluminum, adding aluminiferous material to one of said masses, and withdrawing molten aluminum from the other of said masses, applying heat adequate for casting purposes to one of said masses and puddling in a substantially vertical direction the other of said masses, to incorporate the added material and refine the contents of said mass, and to interchange heated metal beween said masses to maintain adequate melting temperature in said puddled mass.

9. A method of melting and refining aluminum which includes the steps of maintaining melting temperature in communicating masses of molten aluminum in adjacent chambers, adding aluminiferous material containing grease and oil and other heat producing elements to one of said masses in a reducing atmosphere and heating said mass through the fuel material thus added, and withdrawing molten aluminum from the other of said masses after applying heat thereto adequate for casting purposes, and puddling the material in the first mass in a substantially vertical direction to incorporate the added material in a molten metal and refine said mass, and to interchange heated metal between said masses to maintain adequate melting temperature in said puddled mass.

10. A method of melting and refining aluminum which includes the steps of maintaining melting temperature in two communicating masses of molten aluminum by heating one of said masses maintaining a blanket of reducing gases above said mass, feeding material into the other of said masses and thereafter puddling said material from the upper surface of said molten mass to which the material was added toward the bottom of said mass.

11. A method of melting and refining aluminum which includes the steps which consist in maintaining the molten condition of said metal, adding aluminiferous material, carrying a percentage of impurities including iron particles, to said molten material, and continuously puddling the material from a position above the level thereof downwardly in a substantially vertical direction and setting up a plurality of substantially vertical current streams of molten metal to interact upon each other and to float any iron particles at the surface of said metal bath, and skimming said iron particles and other impurities from the surface of said bath.

12. A method of melting and refining metal at high temperatures, which includes the steps which consist in maintaining the molten condition of said metal beneath a bank of hot gases having a reducing action, and refining and deoxidizing the same by continuously puddling the molten material from a position above the level thereof downwardly in a substantially vertical direction and setting up a plurality of substantially vertical current streams of molten metal to interact upon each other.

13. In a method of melting and refining metal at high temperatures, the steps which consist in maintaining the molten condition of such metal and continuously puddling the material from a position above the level thereof downwardly in a substantially vertical direction and setting up a plurality of substantially vertical current streams of molten metal to interact upon each other and to float any foreign particles within said metal bath at the surface thereof.

14. A method of producing metal aluminum from secondary raw material irrespective of admixtures of iron, oxides, alloys, and the like, which includes the steps of heating aluminum to form a molten mass, adding secondary material from above the level of said molten mass, puddling the molten mass of material from a position above the level thereof downwardly in a substantially vertical direction from a point above the liquid level and setting up overlapping currents of molten metal to incorporate the individual portions of added material to substantially deoxidize the molten mass, and to float said iron particles and other impurities, skimming said impurities from the surface and drawing casting metal from said mass.

15. In a method of melting and refining metal, the steps which consist in applying heat to bring the metal to a molten condition, and thereafter maintaining the molten condition of said metal and refining and deoxidizing the same by puddling the molten material from a position outside of the contents downwardly toward the bottom of said mass, and setting up a plurality of interacting current streams of molten metal within said mass.

16. A method of melting and refining aluminum consisting in heating one of two communicating masses of molten metal while directly agitating one of said metal masses only to cause interchange of metal between said masses adding finely divided aluminum to one of said masses and withdrawing molten metal from the other mass of metal for fabricating purposes.

17. A method of melting and refining aluminum as a single continuous operation consisting in heating under slight excess pressure and incomplete combustion one of two communicating closely juxtaposed masses of molten aluminum while directly agitating one of said metal masses only to cause interchange of metal between said masses, adding unmelted material to one of said masses, applying heat to one of said masses and withdrawing molten metal from the mass subjected to heat for fabricating purposes.

18. In a method of reworking finely divided aluminum, the steps which consist of maintaining separate masses of molten aluminum in communication with one another through a narrow passageway adjacent the base of said masses, heating one of said masses and agitating the other of said masses, adding finely divided aluminum to the mass undergoing agitation and withdrawing molten metal from the other mass of metal for fabricating purposes.

19. A method of melting and refining readily oxidizable metal, consisting in maintaining communicating masses of molten metal in agitation while in a non-oxidizing atmosphere by puddling one of said masses, heating directly the other of said masses, adding further portions of said readily oxidizable metal to one of said masses, and withdrawing molten metal from the other mass of metal for fabricating purposes.

20. A method of melting and refining metal, which includes the steps of providing a stationary bath of molten metal, separated in two closely juxtaposed masses normally maintained at an even level having a narrowed area of communication with each other at a point below the normal level thereof, directly heating under slight excess pressure and incomplete combustion one of said masses, and transferring heat to the other of said masses through said narrowed area of communication, supplying metal to be melted to one of said masses, and withdrawing metal from the other of said masses.

JOHN SCHMELLER, Sr.